United States Patent [19]
Schwörer

[11] Patent Number: 5,713,687
[45] Date of Patent: Feb. 3, 1998

[54] COUPLING FOR CONNECTING SCAFFOLDING COMPONENTS

[75] Inventor: Artur Schwörer, Senden, Germany

[73] Assignee: 'Peri GmbH, Weissenhorn, Germany

[21] Appl. No.: 396,912

[22] Filed: Mar. 1, 1995

[30] Foreign Application Priority Data

Mar. 5, 1994 [DE] Germany ............... 44 07 469.7

[51] Int. Cl.⁶ .................................................. E04G 7/30
[52] U.S. Cl. ...................... 403/49; 403/374; 403/316; 403/256; 182/179
[58] Field of Search ................ 403/49, 374, 316, 403/315, 289, 290, 256, 257; 182/179

[56] References Cited

U.S. PATENT DOCUMENTS

| | | | |
|---|---|---|---|
| 1,299,821 | 4/1919 | Carpmill et al. | 403/289 X |
| 2,546,929 | 3/1951 | Nampa | 403/49 X |
| 4,426,171 | 1/1984 | Layher | 182/179 X |
| 5,388,666 | 2/1995 | Schworer | 182/179 |

FOREIGN PATENT DOCUMENTS

| | | |
|---|---|---|
| 3103470 | 8/1982 | Germany . |
| 3545273 | 6/1987 | Germany . |
| 4021602 | 3/1991 | Germany . |
| 4201958 | 8/1993 | Germany . |

*Primary Examiner*—Anthony Knight
*Attorney, Agent, or Firm*—Ernest V. Linek

[57] ABSTRACT

The invention concerns a coupling for the connection of scaffolding components having a coupling mouth in which the closing motion of the jaws is induced by a tensioning means configured as a wedge with ribs running diagonally against its direction of motion during tensioning. In the present invention the ribs (39, 49) work together with teeth (32, 44) on a moveable jaw (20) of the coupling mouth, and the wedge (30) has a curved cross section.

7 Claims, 3 Drawing Sheets

COUPLING FOR CONNECTING SCAFFOLDING COMPONENTS

BACKGROUND OF THE INVENTION

The invention concerns a coupling for the connection of scaffolding components comprising a coupling mouth, whose closing motion of the jaws is induced by a tensioning means in the form of a wedge.

In a coupling known in the art of this type as, for example disclosed in the patent application P 42 01 958.3, the tensioning means comprises a threaded bolt whose head exhibits a ring for gripping and which can be screwed into and guided by a first scaffolding component. The head of the threaded bolt is adjacent to the moveable jaw of the coupling mouth. When screwing in the jaw the coupling mouth effects a closing motion and the claws of the coupling mouth seat on another second scaffolding component which is intended to be firmly attached to the first coupling component on which the coupling is secured.

The coupling known in the art is utilized to connect a cross-running rod to a support.

The tightening of the screw by hand or by means of a tool introduced into the ring is relatively difficult and tedious. In addition it is impossible to prevent the screw threads from becoming dirty and therefore difficult to work on a construction site.

A connecting node for grid scaffolding is known in the art from DE 4021602 with which a clamp comprising two claws interacts with a stand having oppositely positioned grooves. By means of the clamp, the movably mounted claws can be locked. Towards this end a component or pin, translationally displaceable in the clamp, is utilized.

When demounting the string piece or tie bar from the connecting node, it is difficult and cumbersome to remove this wedge out of its clamped position. In addition, dirt often gains entrance to the opening accepting the wedge so that the device becomes jammed.

A turnbuckle for connecting of concrete molding elements is known in the art from DE-PS 35 45 273 with which two turnbuckle arms are tensioned by means of a longitudinally fluted wedge. The longitudinal flutes are arranged in a rotated thread-like fashion on the wedge and thereby interact with teeth on a toothed rack in such a fashion that both the leg which is rigidly attached to the toothed rack as well as the moveable leg exercise a lateral motion. In this fashion, after striking the wedge into the arm, a force which is sufficient to tension the concrete molding element is produced.

The underlying purpose of the invention is to develop a coupling construction which can be rapidly and comfortably connected to the scaffolding component with which the wedge induces a rotational motion of the moveable jaw.

SUMMARY OF THE INVENTION

This purpose is achieved in accordance with the invention in that the ribs work together with teeth in a moveable jaw of the coupling mouth, whereby the wedge is curved on the engaging side.

A coupling configured according to this technical teaching has the advantage that a reliable transfer of forces takes place due to the teething of the jaw and the tensioning means and the moveable jaw is rotated about a particular angle and, due to the curving of the wedge and the large engagement surface, the surface pressure is kept small which leads to an increased life time of the coupling.

The wedge can comprise one piece of flat material comprising a curved cross section about its longitudinal axis, on which the ribs are arranged. This has the advantage that it always remains, with a plurality of ribs, in engagement with the teeth when these teeth are arranged on a curved surface of the moveable jaw exhibiting an approximately cylindrically-shaped section about the pivot axis in the vicinity of the teeth and that the jaws are reliably set into rotation.

A further advantage is that, due to the engagement of the teeth located on the jaws with the tensioning means, the force necessary for locking is minimized so that the scaffolding components can be rapidly attached to each other in a user-friendly manner.

When disassembling the scaffolding components the large seating surface, that is to say the low surface pressure, has the advantage that the tensioning means, in this case the wedge, can be loosened with comparably low amounts of force.

The tensioning wedge can, depending on its construction, be guided in the moveable jaw or on the jaw attached to the scaffolding component or in the scaffolding component which is to be attached. In an embodiment of the invention the tensioning means is guided in the jaw which is rigidly attached to the scaffolding component.

The teeth which work together with the wedge grooves are, in embodiments of the invention, arranged on the yoke of the moveable jaw. These teeth could likewise be configured as diagonally running ribs engaging into the grooves of the wedge.

The teeth could be separated from the outer surface of the moveable jaw. In other embodiments of the invention the teeth are however provided on the inner edge of an opening in the moveable jaw, which could exhibit static advantages.

In embodiments of the invention the moveable jaw can be of solid construction. It exhibits, on at least one side, a shoulder in the vicinity of which an opening is provided for, at the inner edge of which teeth are provided for which protrude into the opening and which work together with the ribs of the tensioning means. The ribs of the tensioning means and the teeth run at an angle with respect to the pivot axis of the jaw to function as wedge surfaces.

The purpose in accordance with the invention is also solved by tensioning means configured as a ring guided on the scaffolding component in a rotatable fashion whose one end surface is configured as a wedge surface and whose other end surface works together with a moveable jaw in such a fashion that the jaw is moved for closing and tensioning the coupling mouth when the ring is displaced in a direction towards the pivoting axis.

A coupling comprised according to this technical teaching has the advantage that the tensioning means transfers the rotational motion exercised by the operator into a lateral motion. In this fashion, a lever action can be advantageously used so that possibly with the assistance of a levering tool, the rotational force necessary for locking remains small. Moreover, the locking force acting on the jaw can be adjusted continuously, so that one guarantees that the coupling is clamped or locked in a sufficiently firm manner but not too firmly.

In an advantageous embodiment, one or more projections can be provided for on the outer periphery of the ring which serve as seating points for leverage tools or as gripping surfaces for the manual locking. This has the advantage that the ring is even easier to turn.

Further features of the invention can be derived from the following description of the embodiments of the invention in connection with the claims and the drawing. The individual features can be realized individually or collectively in embodiments of the invention.

Five embodiments of the invention are shown in the drawing.

DESCRIPTION OF THE PREFERRED EMBODIMENT

Figure 1:
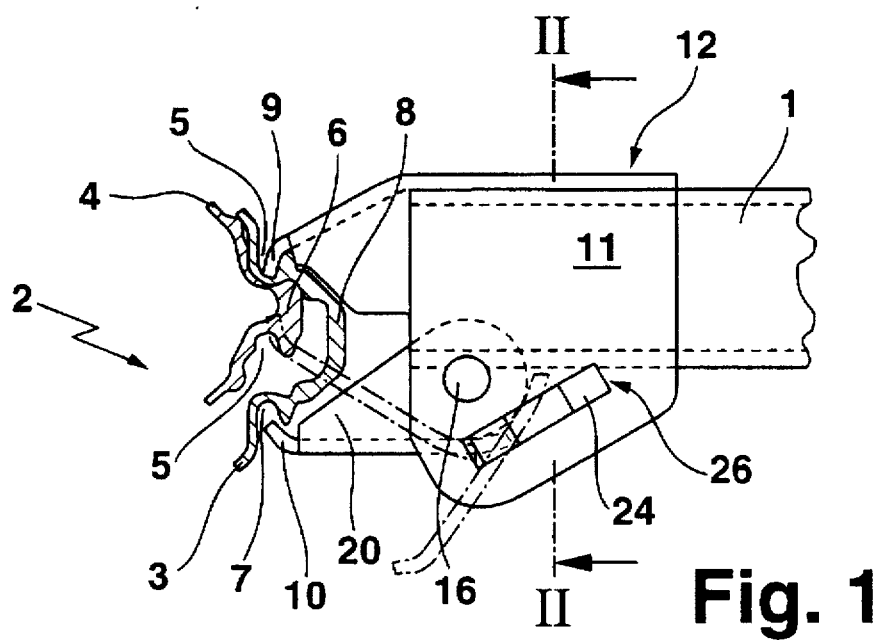
FIG. 1 shows a view of a first embodiment of the coupling in accordance with the invention whereby a closing position of the moving jacket is shown in solid lines, and two other positions with broken lines.
Figure 2:
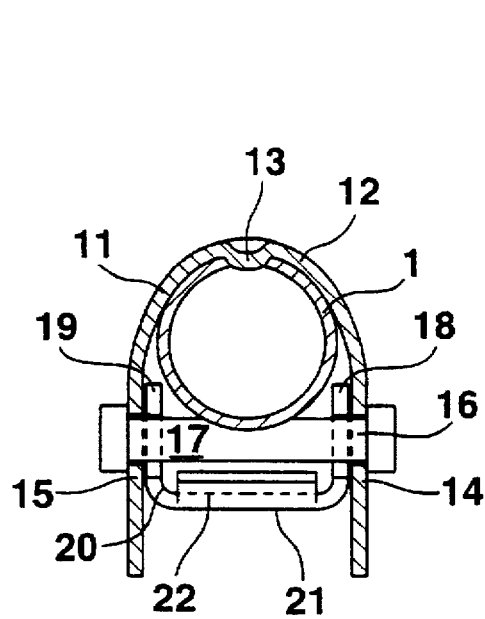
FIG. 2 shows a cut in accordance with line II—II of FIG. 1 without the wedge.
Figure 3:
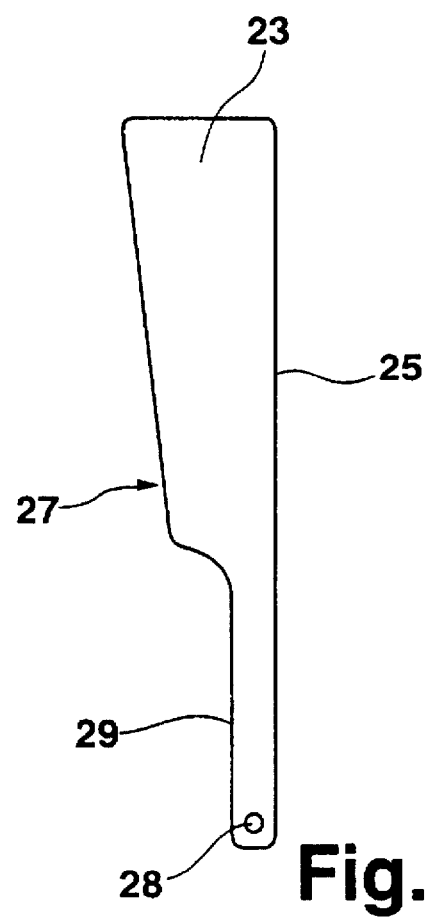
FIG. 3 shows a view of the wedge.

In the embodiments of the invention shown in FIGS. 1 to 3, a transverse pipe 1, associated for example with a stiffening frame, is connected to a telescoping support 2 which exhibits a particular profile to facilitate an attachment of a pipe 1 to an outer pipe 3 as well as to an inner pipe 4 of the support with the assistance of a clamping connection.

This profile exhibits grooves 5 positioned opposite each other on the sides of a protrusion 6 of the inner pipe and corresponding grooves 7 at both sides of a protrusion 8 on the outer pipe into which the claws 9 and 10 of an attachment device can engage.

The embodiment of the coupling device in accordance with the invention exhibits an outer U-shaped jacket 11 whose yoke 12 encloses the end of the pipe 1 and is attached thereto with rivets 13. A bore 16 is provided in arms 14 and 15 in which a bolt 17 is attached. The arms 18 and 19 of an inner jacket 20 pivotably seat on this bolt, the inner jacket 20 likewise comprising a U-shaped cross section and being seated in a pivotable fashion between the arms 14 and 15 of the outer jacket. The claw 9 of the coupling mouth is arranged, at the front end of the outer jacket 11 facing away from the pipe 1, on the corresponding end of the inner jacket 20 of the claw 10 of the coupling mouth on extensions of the yoke 12 or the yoke 21 respectively.

An angle 22 is provided for on the back end of the yoke 21 of the inner jacket 20 facing away from the claw 10 which is adapted to work together with a tensioning means, in the present case, together with a wedge 23.

The wedge 23 is guided in an outer jacket 11 slot 24 which runs diagonally with respect to the longitudinal axis of the pipe 1. The straight side surface 25 of the wedge 23 is supported on the back edge 26 of the opening 24. A wedge surface 27 works, as mentioned, together with the angle 22 on the inner jacket in such a fashion that this inner jacket 20 turns in a clockwise direction about the pivot bolt 17 when hammering the wedge 23 into the slot 24 to lock the coupling mouth.

The wedge 23 exhibits, on its lower end, a bolt 28 which protrudes beyond the outer surface of the wedge and prevents the wedge 23 from being pulled out of the slot 24 provided for in both arms 14 and 15 of the outer jacket. The wedge comprises, between its narrow end near the bolt 28 and the wedge surface 27, a straight surface 29 running parallel to its straight back surface 25. In the event that the wedge 23 is pulled sufficiently far out of the opening 24 such that the straight surface 29 is outside of the pivot region of the angle 22, it is possible for the inner jacket 20 to nearly freely pivot about the bolt 17 so that the claw 10 can be distantly removed from the claw 9, whereby the coupling mouth is extremely wide open. This position is particularly well suited for assembly of the coupling in particular when the coupling must be installed at right angles with respect to the axis of the pipe 1. When the coupling is applied, the wedge surface 27 seats on the angle 22 when hammering in the wedge 23 and with further striking, the inner jacket 20 is rotated about the bolt 17 in such a fashion that the mouth of the coupling closes and seats under tension on the support.

The embodiments of the invention shown in FIGS. 4 to 7 are distinguished from the embodiment in accordance with FIGS. 1 to 3 in that ribs and not the outer edges 27, 29 of a wedge work together with the inner jacket of a coupling, the ribs running diagonally with respect to the longitudinal axis of the tensioning member on its outer surface and the wedge comprising parallel edges and not being wedge-shaped rather substantially rectangular. These diagonally running ribs 31 work together with the teeth 32 which are arranged in the outer surface of the yoke 33 of the inner jacket 34.

Figure 4:
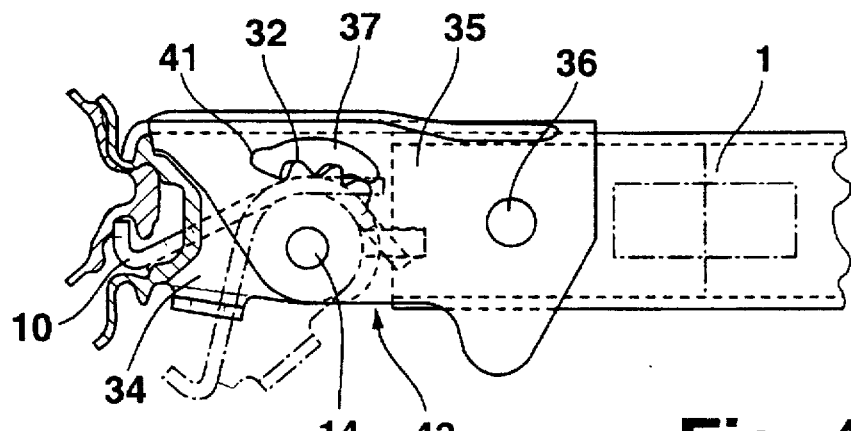
FIG. 4 shows a view of another embodiment of the invention.
Figure 6:
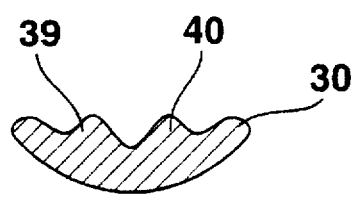
FIG. 6 shows a cut through the wedge according to line VI—VI of FIG. 5 with enlarged scale.
Figure 5:
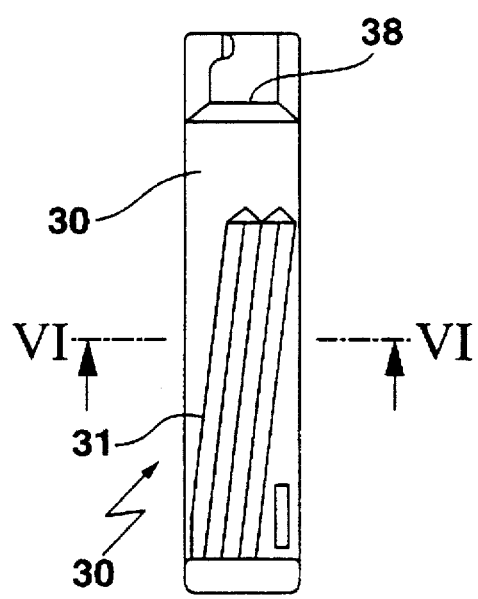
FIG. 5 shows a wedge utilized in the embodiment of FIG. 4.

The outer jacket 35 which is connected to the pipe 1 by means of a rivet or a screw 36, exhibits an opening 37 into which the wedge 30 is guided in such a fashion that its ribs 31 work together with the teeth 32. The ribs 31 are absent on a section 38 adjacent to the end of the wedge 30. In the event that the wedge 30 is pulled sufficiently far out such that the section 38 is located in the motional path of the teeth 32, the inner jacket 34 is freely pivotable about the bolt 17 about a large angle so that the coupling mouth is wide open. In order that the ribs 31 do not only work together with the teeth 32, the wedge 30 is curved as shown in FIG. 6. In this fashion both ribs 39 and 40 nearly completely engage the adjacent teeth 32. The curving of the wedge can correspond to the curving of the yoke of the inner jacket 34 about the bolt 17. The opening 37 in the outer jacket 35 can, as shown in FIG. 4, also be correspondingly curved. When tensioning the coupling the wedge 30 seats on the edge 41 of the opening 37.

Figure 7:
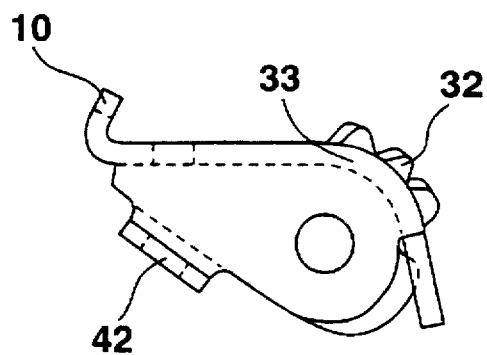
FIG. 7 shows an enlarged scale of the moveable jaw represented in FIG. 4.

A protrusion 42, which is bent outwardly, is located on the inner jacket 34 at the lower edge of the arm of FIG. 7 which seats, in the maximum opening of the coupling mouth, on the lower edge 43 of the outer jacket 35 and thereby limits a further opening motion of the coupling mouth and also prevents the claw 10, in the course of its travel pivoting about the bolt 17, from entering between the arms of the outer jacket 35 to possibly, in consequence of soiling, jam therein to thereby have to be pivoted again out of the arms of the outer shell 35 in the clockwise direction of FIG. 4 when using the coupling.

Figure 8:
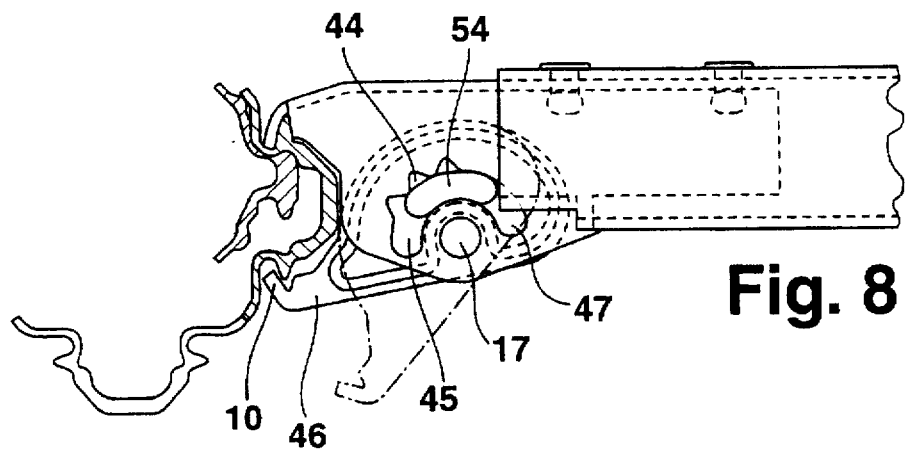
FIG. 8 shows a side view of a third embodiment of the invention.
Figures 9, 11:
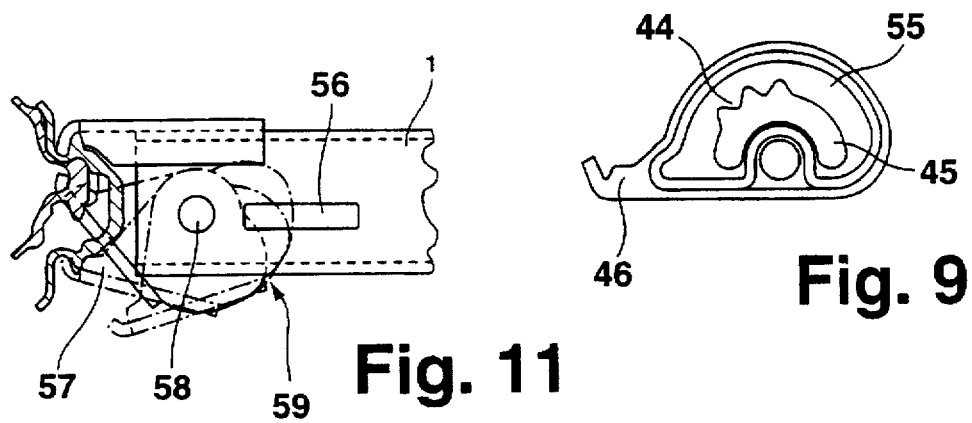
FIG. 9 shows a moveable jaw utilized in the embodiment of FIG. 8.
FIG. 11 shows a view of an additional embodiment.

The embodiments in accordance with FIGS. 8 and 9 distinguish themselves from the embodiment in accordance with FIGS. 4 to 7 essentially in that the teeth 44, which work together with a tensioning wedge, are arranged on the inner edge of an opening 45 which is opened up at a compact metal piece 46 corresponding to the inner jacket. Since, with this embodiment, the teeth 44 are arranged on the edge of the opening 45 facing away from the pivoting bolt 17, the tensioning wedge is curved as in the embodiments in accordance with FIG. 6, but its ribs, which work together with the teeth 44, are located on the outer side of the curved wedge. In this case as well, the wedge exhibits a section in the vicinity of which the inner piece 46 with the claw 10 can pivot out until the edge of the wedge seats on the end 47 of the opening 45. The opening 45 in the inner piece 46 is therefore somewhat longer than in the embodiment in accordance with FIG. 4. The inner piece 46 comprises, on each of its two sides, a recess 55 in which the opening 45 is provided.

Figure 10:
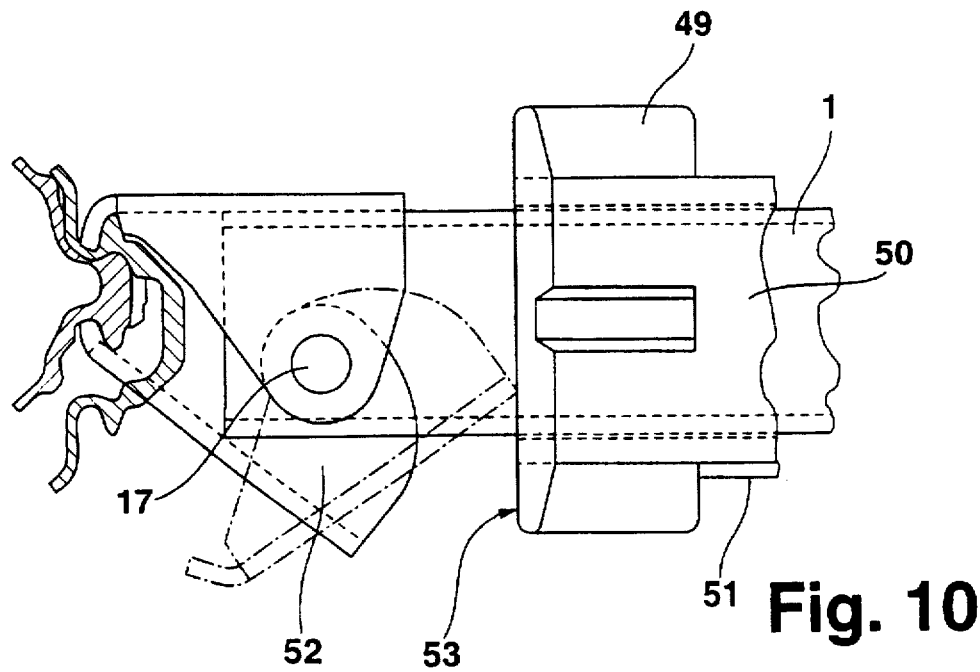
FIG. 10 shows a side view of a fourth embodiment of the invention.

In the embodiment of the invention represented in FIG. 10 an inner jacket 52 is spanned by a ring 49 which is guided on a pipe 1 in a rotatable and translatable fashion. The end side of the ring 49 facing away from the coupling comprises a wedge surface 50 which seats on the abutment 51. In the event that the ring 49, configured as a cylinder section, is rotated its front end surface 53 facing the coupling mouth seats on the back end of the inner jacket 52 and pivots same, under further rotation of the ring 49, about the bolt 17 in a clockwise fashion. The inner jacket 52 can be formed in a similar fashion as the inner jacket 20 of the embodiment in accordance with FIG. 1 and can, with an appropriate angle 22, work together with the end surface 53 of the ring 49.

In the embodiment of the invention represented in FIG. 11 a wedge is guided in an opening 56 penetrating through the pipe 1 and the moveable jaw 57 is seated in a pivotable fashion on a pin 58 penetrating transversely through the pipe 1. The moveable jaw comprises a curved edge 59 on its side facing away from the claw which works together with the wedge surface 50 in such a fashion that the coupling mouth 9, 20 closes when the wedge is driven in.

I claim:

1. A coupling for scaffolding components comprising:
   a housing having an opening;
   a jaw having teeth, the jaw mounted to the housing for rotation about a rotation axis; and
   a wedge member having an insertion axis and parallel ribs extending diagonally with respect to the insertion axis, the wedge member having a surface curved transversely to the insertion axis, the ribs being adapted to engage the teeth for rotating the jaw during insertion of the wedge member into the opening in a direction of the insertion axis.

2. The coupling of claim 1, wherein the jaw comprises an integral yoke and the teeth are arranged on the yoke.

3. The coupling of claim 1, wherein the teeth are configured as diagonally running ribs.

4. The coupling of claim 1, wherein the jaw has an opening and the teeth are arranged on an inner edge of the opening.

5. The coupling of claim 1, wherein the jaw comprises a solid material having a shoulder located at a side of the jaw, the jaw having an opening in proximity to the shoulder, and the teeth being located at an inner edge of the opening to protrude into the opening.

6. The coupling of claim 1, wherein the ribs and the teeth run at an angle with respect to the rotation axis.

7. A coupling for scaffolding components comprising:
   a housing having an opening;
   a jaw mounted to the housing for rotation about a rotation axis and having teeth protruding radially with respect to the rotation axis; and
   a wedge member having an insertion axis and parallel fibs extending diagonally with respect to the insertion axis, the wedge member having a surface curved transversely to the insertion axis, the ribs being adapted to engage the teeth for rotting the jaw during insertion of the wedge member into the opening in a direction of the insertion axis substantially parallel to the rotation axis.

* * * * *